Jan. 28, 1958 J. P. HOPPE 2,821,393
PRODUCTION OF MOVING LIGHT EFFECTS
Filed Feb. 16, 1954 6 Sheets-Sheet 1

INVENTOR.
JOHN P. HOPPE
BY
ATTORNEY

Jan. 28, 1958 J. P. HOPPE 2,821,393
PRODUCTION OF MOVING LIGHT EFFECTS
Filed Feb. 16, 1954 6 Sheets-Sheet 2

INVENTOR.
JOHN P. HOPPE
BY
ATTORNEY

Jan. 28, 1958 J. P. HOPPE 2,821,393
PRODUCTION OF MOVING LIGHT EFFECTS
Filed Feb. 16, 1954 6 Sheets-Sheet 3

INVENTOR.
JOHN P. HOPPE
BY

Jan. 28, 1958 J. P. HOPPE 2,821,393
PRODUCTION OF MOVING LIGHT EFFECTS
Filed Feb. 16, 1954 6 Sheets-Sheet 5

INVENTOR.
JOHN P. HOPPE
BY
ATTORNEY

Jan. 28, 1958     J. P. HOPPE     2,821,393
PRODUCTION OF MOVING LIGHT EFFECTS Filed Feb. 16, 1954     6 Sheets—Sheet 6

INVENTOR.
JOHN P. HOPPE
BY *Robert E. Burns*
ATTORNEY

United States Patent Office 2,821,393
Patented Jan. 28, 1958

2,821,393

PRODUCTION OF MOVING LIGHT EFFECTS

John P. Hoppe, Morton Grove, Ill., assignor of one-fourth to Robert E. Burns, New York, N. Y.

Application February 16, 1954, Serial No. 410,569

Claims priority, application Great Britain February 16, 1953

19 Claims. (Cl. 272—10)

This invention relates to the production of moving light effects on a screen or the like and has for its object to provide an improved effect or display of this kind which is adapted to afford amusement or artistic interest. A further object is to provide improved apparatus for the above purpose.

The invention comprises providing a relatively concentrated source or beam of light, directing an image or images of the source or beam upon a screen or the like by means of an interposed flexible reflecting surface or surfaces capable of relative displacement or distortion, and manually flexing or distorting the reflecting surface or surfaces in conjunction with positioned displacements thereof to cause changes of position and form of the image or images upon the screen or the like and afford a display of an amusing or artistic character. The image may be an illuminated area which is modified in any desired manner by means described hereinafter.

The invention also comprises an enclosure, preferably of elongated form open at one or both ends and containing a light source, means for controlling the light source, and means for modifying either the color or form, or both, of the beam of light projected from the open end or ends of the enclosure for use in providing a moving light display as set forth in the preceding paragraph.

The invention also comprises a reflector having a reflecting surface or surfaces of a flexible character or capable of relative displacement or distortion, and means for partially obstructing or masking the reflecting surface or surfaces.

The invention also comprises a reflector having a reflecting surface or surfaces of a flexible character or capable of relative displacement or distortion, and a flexible or deformable backing or support for the reflecting surface or surfaces. The backing or support may be constructed in such a manner as by flexible or movable joints or connections that relative displacements of different parts of the reflector surface or surface elements can be effected in different directions.

In the accompanying drawings which illustrate various modes in which the invention can be carried into effect.

Figure 41 is a section taken approximately on the line 41—41 in Figure 39;

Figure 42 is a fragmentary section through a reflector showing how a magnetic mask is held in place on a reflector by a magnet;

Figure 1:
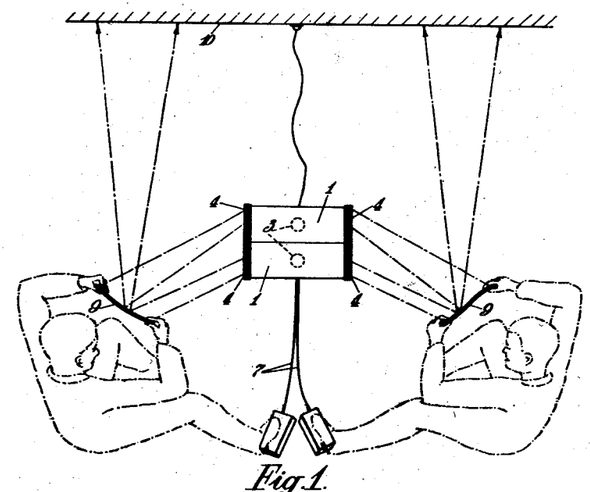
Figure 1 is a plan view of a light projection apparatus in accordance with the invention showing the mode of operation.
Figure 2:
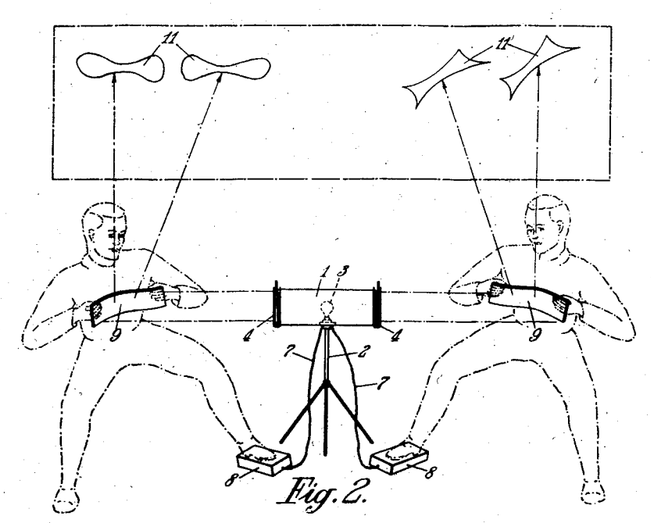
Figure 2 is an elevation of the apparatus of Figure 1.
Figure 3:
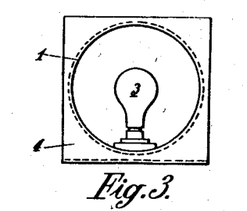
Figure 3 is an end view of a light projection tube.
Figure 4:
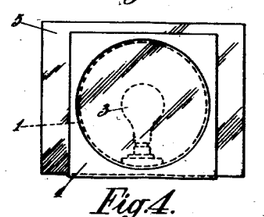
Figure 4 is an end view of the tube with a colored filter or screen.
Figure 5:
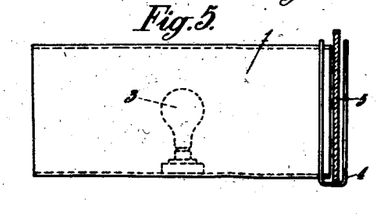
Figure 5 is a sectional elevation of the tube shown in Figure 4.
Figure 6:
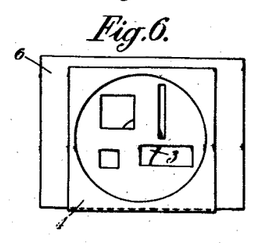
Figure 6 is an end view of the light projection tube with a mask.
Figure 7:
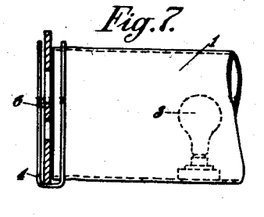
Figure 7 is a sectional elevation of the tube shown in Figure 6.

In carrying the invention into effect according to one convenient mode as shown in Figures 1 to 7, a light projection apparatus is provided comprising a pair of tubes 1 secured side by side and each open at both ends. A single tube only can be provided if desired. The tube or tubes are supported in horizontal position by a stand 2 which may be of the collapsible type as indicated in Figure 2. A light source which may be a lamp bulb 3, preferably affording a concentrated or substantially point source of light, is mounted in each tube, preferably at the center thereof. At one or both ends of each tube is attached a channel shaped holder 4 adapted to receive either a colored filter or screen as shown at 5, or an apertured mask as shown at 6 in Figures 4, 5 and 6, 7 respectively. The filter or screen may comprise a sheet of colored gelatine or other transparent material or may comprise an assemblage of colored sheets or plates. The mask may comprise any suitable opaque material such as paper shaped or apertured to the desired shape and may also be combined with one or more colored filters or screens. Current is supplied to the lamp 3 or each of them by a flexible cable 7 in which is included a foot-controllable switch indicated at 8.

The arrangement described above is suitable for use by two performers as shown in Figures 1 and 2. Each performer holds a reflector or mirror 9, preferably of a flexible character as described hereinafter, to throw the light rays emitted from the projector upon a screen or the like 10 to produce images 11 thereon of the light source modified by the screens or masks, when provided, and by the nature and character of the reflectors. In the particular arrangement described, each reflector can be positioned to produce two images on the screen and these images can be given movements, and by using reflectors of a flexible character can be caused to change in form, as the reflectors are manipulated by the performers to distort the reflecting surface or surfaces thereof.

A flexible reflector for employment with a light projection apparatus as described above is shown in Figures 8 and 9. The reflector 12 is of suitable flexible material which may comprise vacuum plated plastic, polished metal such as plated and polished spring steel, or flexible glass silvered on one side. The reflector 12 is laminated or provided with a transparent covernig 13 for protective or other purposes, or to modify its properties, e. g. its stiffness or elasticity.

Figure 9:
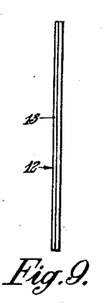
Figure 10:
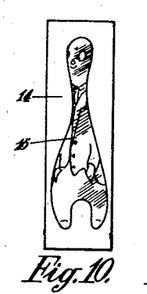
Figures 10 and 11 are front and side elevations of a modified form of mirror.
Figure 11:
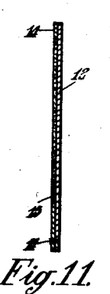
Figures 12, 13:
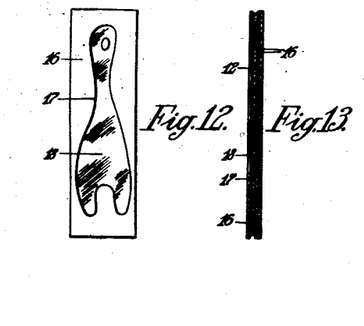
Figure 12 is a front elevation of a flexible mirror provided with an enclosing mask.
Figure 13 is a longitudinal section of Figure 12.
Figure 14:
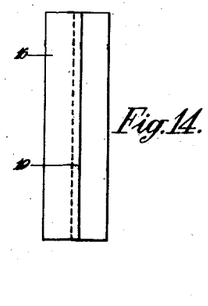
Figure 14 is a rear elevation of Figure 12.
Figure 15:
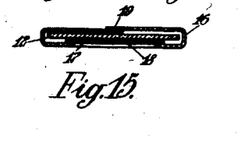
Figure 15 is a cross section of Figure 12.

A form of masking for controlling the light reflected from the flexible mirror surface is shown in Figures 10 and 11. The reflector 12 is provided with a covering mask 14 of opaque material provided with a transparent aperture 15 of any desired shape. The mask is secured to the reflector surface by adhesion. The mask may comprise for example a printed or otherwise produced design on an emulation applied to the reflector. Alternatively a transfer design such as decalcomania may be employed, or any type of transparency which can be applied by adhesion or incorporated as a lamination. Thus for example the mask may be incorporated in or applied to a transparent covering such as 13 in Figure 9. This covering may be of transparent plastic material suitably dyed, the treated surface being disposed adjacent to the reflector surface, or a suitably dyed layer of material may be sandwiched between the reflector surface and the covering plate.

A mask of composite form adapted to enclose the reflector is shown in Figures 12 to 15. The mask is formed of paper or other opaque material 16 folded into a flattened tube enclosing the rectangular reflector 12, one side of the tube being apertured at 17 to afford any desired shape. A window or screen of colored material 18 such as cellophane is secured over the aperture and may be painted or otherwise provided with any desired design. The material of the mask 16 is overlapped at 19 and secured in any desired manner. It will be understood that the mask may be formed as an envelope or may be of circular tube shape. Reflectors and masks can readily be exchanged in this form of mask.

Figures 16, 17, 18, 19, 20, 21, 22:
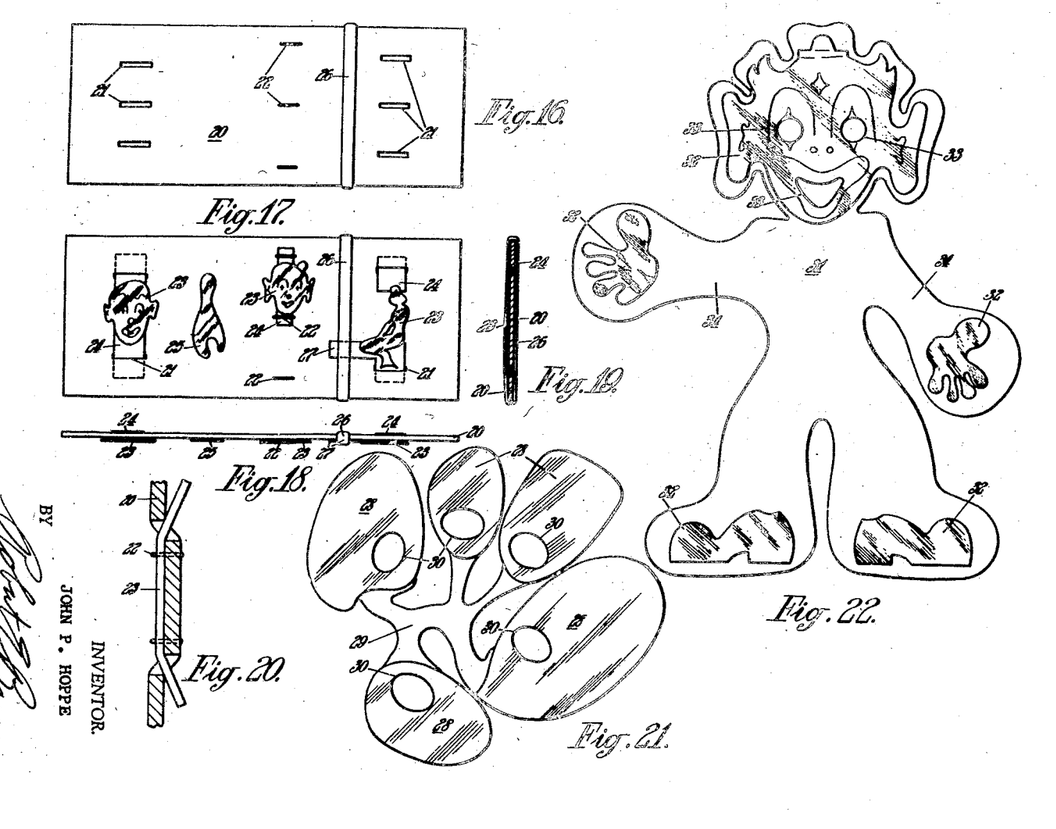
Figure 16 is an elevation of a backing for a plurality of reflectors.
Figure 17 is a similar view with the reflectors in position.
Figure 18 is a plan view of Figure 17.
Figure 19 is a sectional end view of Figure 17.
Figure 20 is a sectional end view showing a detail of the reflector attachment.
Figure 21 is an elevation of a reflector comprising a plurality of mirrors.
Figure 22 shows a plurality of mirrors mounted on a shaped backing.

A flexible form of backing or base to which any desired number of reflectors can be releasably secured is shown in Figures 16 to 20. A sheet 20 of flexible material has attachment means which may comprise slots 21 or projecting U-shaped retainer loops 22 or both. Reflectors 23 of any desired form are secured to backing strips 24 which can be inserted into the slots or passed through the retainers. These backing members are preferably formed from flexible material, for example spring steel. If desired the flexible reflector itself may be shaped to enter the slots or retainers as shown in Figure 20. If desired, one or more flexible reflectors 25 may be adhesively secured to the backing. Another form of securing means comprises a rubber or like band 26 encircling the base sheet 20. One or more extended portions, as 27, of the reflector backing strip or member can be secured beneath the band.

Figure 8:
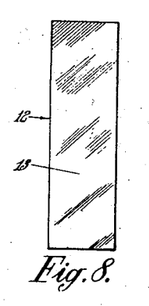
Figures 8 and 9 are front and side elevations respectively of a flexible mirror according to the invention.

Another form of reflector shown in Figure 21 comprises a plurality of flexible reflector elements 28, which may be constructed as described in conjunction with Figures 8 and 9, bonded to a branched center element 29 of spring steel or other flexible material. The reflector elements are formed with apertures 30 through which the ends of the fingers can be inserted to enable the flexing of the elements to be controlled by the performer, center 29 being shaped to afford bending where this is required. In this form the reflector elements may be rigid if desired and the flexibility or bending may be afforded by the backing.

Figures 23, 24, 25, 26, 27, 34:
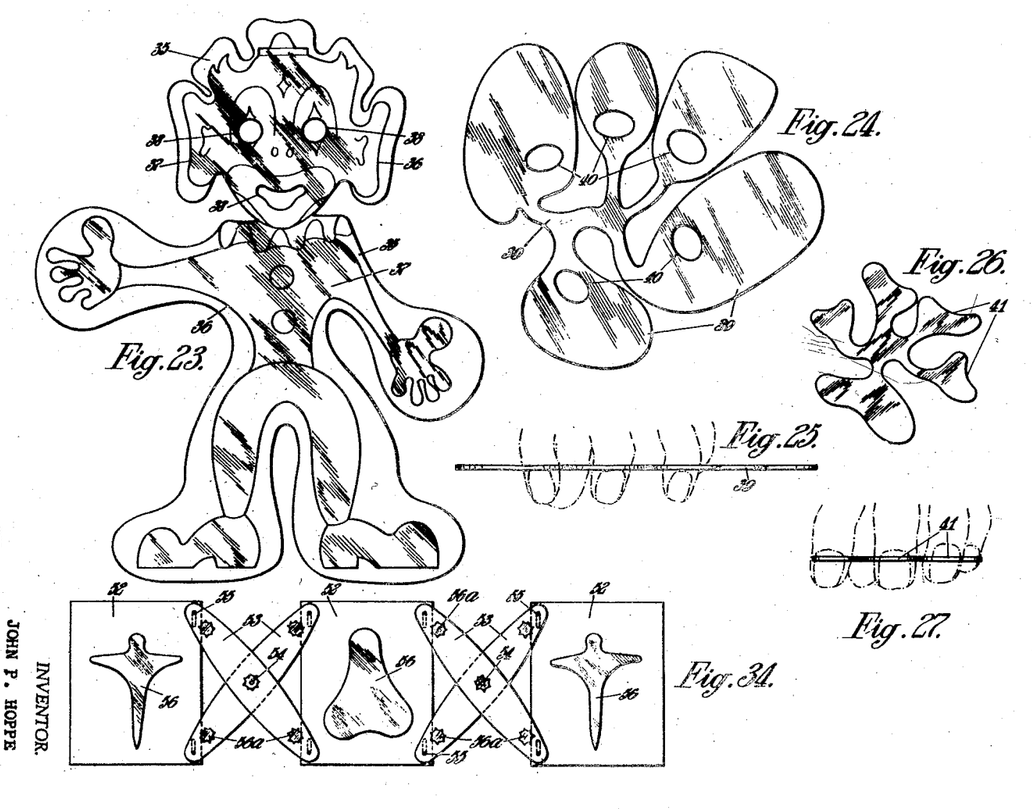
Figure 23 shows another form of reflexible reflector.
Figures 24 and 25 are an elevation and plan respectively of a further form of flexible reflector.
Figures 26 and 27 are views similar to Figures 24 and 25 of a further form of reflector.
Figure 34 is an elevation of another form of reflector.

The reflector shown in Figure 22 comprises a flexible backing or base 31 shaped to represent a human form and having attached to it reflector elements 32 shaped to represent the face, hands and feet. Apertures 33 or other means may be provided for finger control. It will be seen that the backing can be more readily flexed at narrowed areas 34 provided in the arms, whereas at the hands the backing is wider so that it can be flexed in more than one direction. If desired, the ears may be separated from the head to afford greater ease of control. The reflector elements may be masked in any desired manner as described in previous examples, and may be individually flexible or rigid. Figure 23 shows a reflector of similar shape to that described previously but consisting of a shaped member 35 of opaque material such as flexible plastic formed with a shaped aperture 36, the reflector being secured to the back thereof. The aperture 36 may be covered by a transparent screen 37 which is colored or has any desired design applied thereto as shown. Apertures 38 are provided for finger holds. The masking material 35 is suitably attached to the reflector, for example adhesively. Instead of being a unitary masking member, it may be made up of suitable pieces of masking material, preferably provided with an adhesive backing so that they can readily be applied to the reflector to provide the desired shape, outline or coloration.

Figure 24 shows a reflector of similar shape to that illustrated in Figure 21, but is formed from a single sheet of flexible plastic material 39 having apertures 40 for finger holds. A flexible reflector surface is applied or secured to the plastic sheet in any desired manner. Figure 25 shows the manner in which the reflector may be held in the hand.

Figure 26 shows a similar form of reflector in which indentations such as 41 are employed for finger holds as illustrated in Figure 27.

Figures 28, 29, 30, 31, 32, 33:
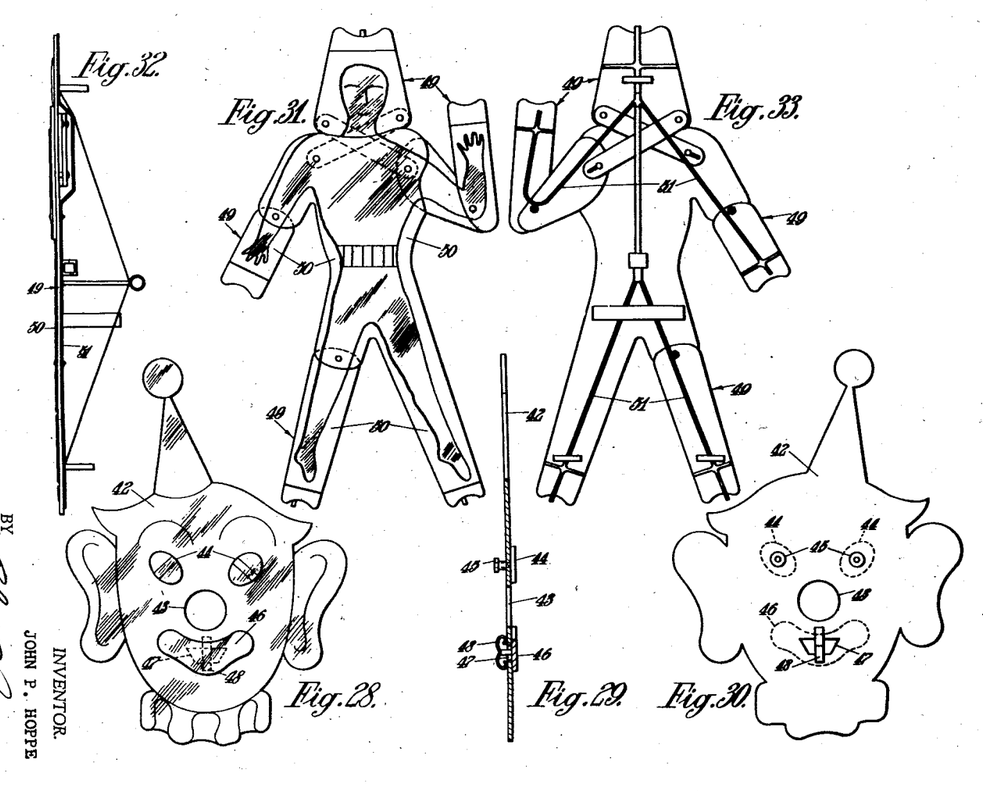
Figures 28, 29 and 30 are views of another form of reflector, showing the reflector in front elevation, section and rear elevation respectively.
Figures 31, 32 and 33 are views of a reflector having the form of a jointed human figure; showing the figure in front elevation, vertical section and rear elevation respectively.

Figures 28, 29 and 30 show a reflector formed in the shape of a human head. A flexible or rigid reflector 42 which may be constructed in any of the modes previously described has an aperture 43 to receive the performer's finger. Small mirrors 44 shaped as eyes are rotatably mounted on pins which extend through holes in the reflector and are provided with finger pieces 45 which can be actuated by the performer. Also a mirror 46 shaped as a mouth is secured in a slot 47 by means of a spring clip 48 which engages the back of the reflector. By this means the mirror 46 can be displaced and rotated by the performer as desired.

In the reflector arrangement shown in Figures 31, 32 and 33 a reflector or a plurality of connected flexible reflectors 49 are provided with a border 50 of moldable plastic (or other opaque) material leaving an exposed mirror surface shaped as a human figure. The plastic material forming the border 50 is preferably a moldable material, for example vinyl acetate resin, having the plasticity of molding clay or putty and the characteristic of retaining its shape until remolded. Such material is used, for example, by children to blow up into plastic balloons by placing a ball of the material over the end of a tube and then blowing through the tube. The plastic material is adhesively secured to the edge of the reflector, for example by means of an adhesive or a solvent, leaving the remainder of the material free to be pressed out into any area desired so as to change the shape of the figure represented by the uncovered reflector surface. The reflector is also provided with additional masking means 60 (Figure 31) which may be colored, transparent or opaque material adhesively attached to the reflector.

For example, the masking material 60 may be in the nature of "Scotch" tape that can be applied to the reflector and can be subsequently peeled off when it is desired to change the masking.

The reflector or reflectors are mounted on a base or skeleton frame 51 of a deformable material such as lead wire for example which may be bent by the performer in different directions as required for the desired flexing of the reflecting surfaces of their relative displacement or distortion. The purpose of the frame 51 is to maintain the desired position for an extended period until it is again changed. It is designed so as to control the twisting of the parts as well as the flexing and bending of parts of the mirror.

The reflector shown in Figures 31 to 33 is articulated, being made up of several different parts. Thus, for example, the arms and one of the legs are shown as being joined to the body portion by means of pivoted joints 61. The pivots are preferably provided by small bolts having nuts 62 (Figure 33) which can be tightened to hold the members in adjusted position. The head portion is shown as being joined to the body by means of a pantograph linkage 63 permitting angular or translational movement of the head relative to the body. The frame is provided with a slip joint to permit the desired movement.

Means is provided for manipulating the reflector shown in Figures 31 to 33 so as to represent movement and change of size of the reflected image. A band 64, which is preferably flexible and elastic, is adapted to fit on the hand of a performer so as to hold the reflector. A push rod 65 is pivotally connected to the back of the reflector at 66 and is provided at its outer end with a thumb or finger ring 67. Strings 68 extend from the push rod 65 to various portions of the figure, for example to the legs and head. Finger rings 69 are also shown on rear portions of the reflector, to facilitate imparting to the reflector a wide range of movements providing for great versatility by the performer.

Means is also provided for mounting the reflector of Figures 31 to 33 on a suitable support so that a performer can manipulate still other figures. As illustrated in the drawings, the supporting means comprises relatively stiff tabs adapted to be slipped into slots or loops of a suitable support, such as that illustrated in Figures 16 to 20. The tabs 70 are preferably cut out, as indicated at 71, to provide finger tip recesses for the performer. The frame or armature 51 of the reflector is also provided with a socket or aperture 72 that is adapted to fit on a suitable holder, for example, the knee holder illustrated in Figure 35.

In the reflector arrangement shown in Figure 34, three backing or base members 52 are connected by narrow crossed backing members 53 pivoted at 54. The members 53 are connected to the members 52 by pin and slot connections, constituting a pantograph. Flexible reflector elements 56 are attached to the backing members in any convenient manner, and further reflector elements can be attached to the members 53. The arrangement permits the mirror elements 56 to be moved together or apart by an accordion-like motion of the performer's hands and thus enables greater control over the reflected images to be obtained. The arrangement also enables one or more of the reflector elements to be readily moved out of the range of the light beam during a performance.

It will be understood that in any of the previously described examples where two or more separate reflector elements are employed, these separate elements or some of them can be individually rigid if desired and the desired flexibility or capability of distortion can be afforded by the backing.

Figure 35:
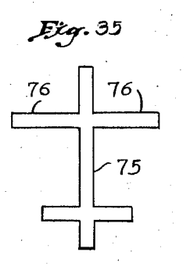
Figure 35 is an elevation of a knee support adapted to be used with reflectors, as illustrated for example in Figures 31 to 33.

In Figure 35, there is shown a "knee-holder" 75 having a plurality of arms 76 for holding reflectors provided with suitable means for attaching them to the holder, as, for example, the socket 72 shown in Figures 32 and 33. The member 75 is adapted to be held between the knees of a performer enabling him to manipulate a larger number of figures. It is preferably formed of flexible or bendable material, for example lead strips or bars of non-circular cross section.

Figure 36:
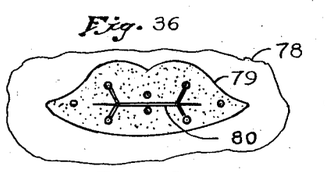
Figures 36, 37 and 38 are a front view, top view and vertical section, respectively, of a portion of a reflector showing how a local area of the reflector can be flexed to produce lip movement, etc.
Figure 37:
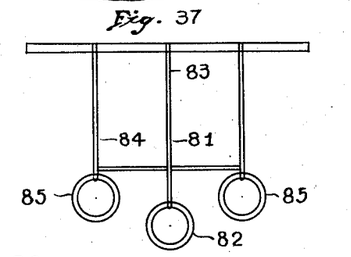
Figure 38:
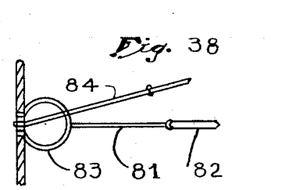

Figures 36 to 38 illustrate means for manipulating a portion of a reflector to simulate movements such as the opening or closing of a mouth or an eye. A flexible reflector 78 is provided with a colored or mask area 79 in which there is provided a slit 80. A push rod 81, having a finger ring 82 at its outer end, is connected by a flexible loop 83 with the flexible reflector on opposite sides of the slit 80. A U-shaped bar 84 is attached to the flexible reflector at opposite ends of the slit 80 and is preferably provided with one or more finger rings 85. By relative movement of the push rod 81 and U-shaped bar 84, the slit 80 can be opened and closed and the adjacent portions of the reflector can be flexed so as to produce different expressions of the figure represented. While the colored or mask area 79 has been shown in the shape of a mouth, the same arrangement is applicable to other apertures, for example an eye, which can be made to open and close or wink.

Figure 39:
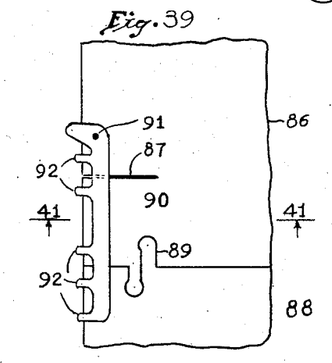
Figures 39 and 40 are rear views of a portion of a reflector showing how separable portions can be held together by a "solidifier"
Figure 40:
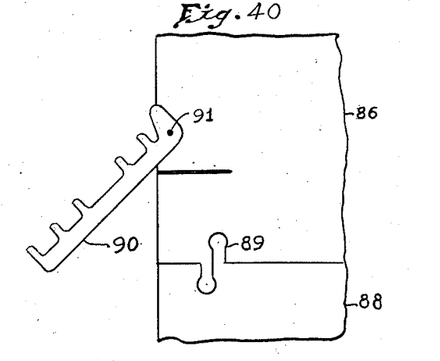

In Figures 39 to 41, there is shown a portion of a flexible reflector 86 partially divided into two areas by a slit 87 and having a separable portion 88 joined to the portion 86 by a dovetail joint 89. The portion 88 is separable from the portion 86 and the slot 87 permits separate flexing of portions of the reflector. When it is desired to have these portions function together, they are held by a "solidifier" 90 which comprises a strip of flexible material pivotally connected to the reflector at 91 and having spring clip portions 92 (Figure 41) adapted to grip and hold edge portions of the reflector. Thus, with the "solidifier" 90 in the position shown in Figure 39, the portions of the reflector function together. By removing the solidifier or swinging it out, as shown in Figure 40, separate functioning of the various portions of the reflector is permitted. The strip 90 is preferably flexible, although in some instances it may be desirable to use a more rigid member to restrain flexing of a particular portion of the reflector.

Figure 43:
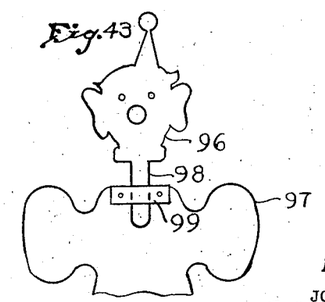
Figure 43 is an elevation of a portion of a reflector showing how separable and interchangeable portions of a reflector can be attached to a main portion.

Figure 42 illustrates how a magnetic mask 93, formed for example of thin sheet iron or of flexible sheet material containing or coated with magnetic material, is held in position on a reflector 94 by means of one or more small magnets 95. Figure 43 illustrates a head portion 96 removably joined to a body portion 97 by means of a tab 98 fitting into a slot or bracket 99. This construction provides means for readily substituting one head for another. It will be understood that it is likewise applicable to other members.

It will be appreciated that the invention is in no way limited to the specific embodiments shown and described by way of example. Moreover, the individual features of the several embodiments are mutually interchangeable and may be substituted for one another as desired. Still other changes and modifications will be apparent to those skilled in the art.

What I claim and desire to secure by Letters Patent is:

1. In the production of animated light effects on a screen, providing a high intensity concentrated source of light, directing light from said source onto a flexible sheet projecting unit having a reflecting surface and bordering non-reflecting areas defining a reflecting area having reentrant portions and having a resemblance to an animate figure composed of a plurality of members, said non-reflecting areas having reentrant outer edge portions and being a configuration to control the relating flexibility of individual portions of said unit, projecting reflected light from said source onto said screen to produce on the screen an enlarged image of said figure, and manually moving said unit and flexing individual portions of said unit to produce both bodily movement of said image on the screen and movement of individual members of said image relative to one another.

2. In a system for producing animated light effects on a screen, a concentrated electric light source, means for supplying electric current to said light source and for controlling said current, a screen and a flexible sheet projecting unit having a reflecting surface and bordering non-reflecting areas defining a reflecting area having reentrant portions and having a resemblance to an animate figure composed of a plurality of members, said non-reflecting areas having reentrant outer edge portions and being of varying width to control the relative flexibility of individual portions of said unit, said unit being sufficiently flexible to be easily flexed by digital pressure and being provided with means for holding said unit manually in a position to project light reflected from said source onto said screen to produce on the screen an enlarged image of said figure and for manually moving said unit and flexing individual portions of said unit to produce both bodily movement of said image on the screen and individual movement of individual portions of said image relative to one another.

3. A system according to claim 2, in which portions of the reflector are colored to produce a colored image on said screen.

4. A system according to claim 2, in which portions of the reflector are of different colors to produce a multicolored image on said screen.

5. A system according to claim 2, in which the coloring is provided by a transparent color filter superposed over at least a portion of said reflecting surface.

6. In a system for producing animated light effects on a screen, a high intensity concentrated electric light source, means for supplying electric current to said light source and for controlling said current, a screen and an image projecting unit comprising a flexible sheet having a reflecting surface, said sheet being sufficiently flexible to be easily flexed by digital pressure, means masking border areas of said surface to a reflecting area having a shape resembling an animate figure composed of a plurality of members, said sheet having reentrant edge portions dividing said members and locally increasing the flexibility of the sheet to permit individual movement of said members, said unit being provided with means for holding said unit manually in a position to project light reflected from said source onto said screen to produce on the screen an enlarged image of said figure and for manually moving said unit and flexing individual portions of said unit to produce both bodily movement of said image on the screen and individual movement of individual members of said image relative to one another.

7. A system according to claim 6, in which the masking means is movable relative to said reflecting surface to expose variable portions of said surface.

8. A system according to claim 6, in which the masking means is adhesively applied to said reflecting surface.

9. In a system for producing animated light effects on a screen, a high intensity concentrated electric light source, means for supplying electric current to said light source and for controlling said current, a screen and an image projecting unit comprising a flexible backing and a plurality of reflector portions on said backing, said backing being sufficiently flexible to be easily flexed by digital pressure, said reflector portions together defining a shape resembling at least one animate figure composed of a plurality of members, and being connected by portions of said flexible backing providing individual movement of said members relative to one another, means for manually holding said unit in a position to project light reflected from said source onto said screen to produce on the screen an image of said figure and for manually moving said unit and locally flexing individual portions of said backing to produce both bodily movement of said image on the screen and movement of individual portions of said image relative to one another.

10. A system according to claim 9, in which said reflector portions are movably and detachably mounted on said backing.

11. In a system for producing animated light effects on a screen, a high intensity concentrated electric light source, means for supplying electric current to said light source and for controlling said current, a screen and an image projecting unit comprising a flexible sheet having a reflecting surface and bordering non-reflecting areas defining a reflecting area having reentrant outlines and having a resemblance to an animate figure composed of a plurality of individual members, said sheet being sufficiently flexible to be easily flexed by digital pressure and having reentrant cut-out portions between said members to afford individual movement of said members, said unit being provided with means for manually holding said unit in a position to project light reflected from said source onto said screen to produce on the screen an image of said figure and for manually moving said unit and moving individual portions of said unit individually to produce both bodily movement of said image on the screen and individual movement of portions of said image relative to one another.

12. A system according to claim 11, in which said holding means comprises finger recesses provided in the edges of said sheet.

13. A system according to claim 11, in which said holding means comprises finger holes provided in said sheet and are spaced from the edges of said sheet.

14. A system according to claim 11, in which said sheet is slit and means are provided for flexing the edge portions defining said slit.

15. A system according to claim 11, in which elements affixed to the back of said sheet are provided for pushing and pulling local portions of the sheet to flex said sheet locally.

16. In a system for producing animated light effects on a screen, a high intensity concentrated electric light source, means for supplying electric current to said light source and for controlling said source, a screen and an articulated image projecting unit comprising a plurality of reflecting elements movably connected with one another, said elements together having a shape resembling an animate figure composed of a plurality of members and means for manually holding said unit in a position to project light reflected from said source onto said screen to produce on the screen an image of said figure and for manually moving said unit as a whole and for moving individual elements of said unit relative to one another to produce both bodily movement of said image on the screen and movement of individual portions of said image relative to one another.

17. A system according to claim 16, in which said elements are mounted on a frame that is bendable to permit individual movement of said elements and has the property of keeping the shape to which it is bent to hold said elements temporarily in the position to which they have been moved.

18. In a system for producing animated light effects on a screen, a high intensity concentrated electric light source, means for supplying electric current to said light source and for controlling said current, a screen and an image projecting unit comprising a flexible frame and flexible reflecting sheet material mounted on said frame, said frame and sheet material being easily flexible by digital pressure, said sheet material having reflecting areas resembling in shape an animate figure having a plurality of members, said frame having portions that are movable relative to one another to effect individual movement of said members and means for manually manipulating said frame and reflecting sheet material to project light from said source onto said screen to produce on the screen an image of said figure and to produce both bodily movement of individual portions of said image relative to one another.

19. A system according to claim 18, in which said frame is bendable to permit flexing said reflecting sheet material and has the property of keeping the shape to which it is bent to hold said reflecting sheet material in selected flexed position.

References Cited in the file of this patent

UNITED STATES PATENTS

| | | |
|---|---|---|
| 2,067,090 | Likes | Jan. 5, 1937 |
| 2,453,965 | Bewley | Nov. 16, 1948 |
| 2,614,363 | Bowditch | Oct. 21, 1952 |

FOREIGN PATENTS

| | | |
|---|---|---|
| 473,382 | Great Britain | A. D. 1937 |